(12) United States Patent
Ruschhaupt (10) Patent No.: US 11,363,439 B2
(45) Date of Patent: Jun. 14, 2022

(54) METHOD FOR COMMUNICATING EMERGENCY MESSAGES TO AN ELECTRONIC DEVICES ASSOCIATED WITH A TARGET PERSON

(71) Applicant: Ryan Ruschhaupt, Lake Almanor, CA (US)

(72) Inventor: Ryan Ruschhaupt, Lake Almanor, CA (US)

( * ) Notice: Subject to any disclaimer, the term of this patent is extended or adjusted under 35 U.S.C. 154(b) by 67 days.

(21) Appl. No.: 17/088,553

(22) Filed: Nov. 3, 2020

(65) Prior Publication Data

US 2021/0329439 A1 Oct. 21, 2021

Related U.S. Application Data

(63) Continuation-in-part of application No. 16/798,066, filed on Feb. 21, 2020, now Pat. No. 10,827,339.

(60) Provisional application No. 62/809,126, filed on Feb. 22, 2019.

(51) Int. Cl.
*H04W 4/90* (2018.01)
*H04W 12/06* (2021.01)
*H04W 4/06* (2009.01)

(52) U.S. Cl.
CPC .............. *H04W 4/90* (2018.02); *H04W 4/06* (2013.01); *H04W 12/06* (2013.01)

(58) Field of Classification Search
CPC .......... H04W 4/90; H04W 4/06; H04W 12/06
USPC ...................................................... 455/404.1
See application file for complete search history.

(56) References Cited

U.S. PATENT DOCUMENTS

2009/0216560 A1* 8/2009 Siegel .................... G16H 20/10
705/2
2019/0141280 A1* 5/2019 Bottomly ................ G01S 19/13

* cited by examiner

*Primary Examiner* — Joel Ajayi
(74) *Attorney, Agent, or Firm* — Richard A. Ryan (57) ABSTRACT

A method of communicating emergency messages from emergency personnel, in or associated with an emergency vehicle, to a target person, who may be in a motor vehicle, in order to encourage, suggest or demand the target person take appropriate action to benefit the emergency personnel and/or the target person. A transmitter associated with the emergency personnel transmits an electronic signal carrying the message and an electronic device, such as a radio, cell phone or loudspeaker, associated with the target person receives the message and communicates the message to the target person. The transmitter can limit the distance of the electronic signal to a signal radius so only target persons in the signal radius receive the message. Security codes can be used to allow the two devices to securely link together. The emergency vehicle can be manned or unmanned vehicles, including autonomously operated vehicles, remotely controlled vehicles, drones and robots.

13 Claims, 2 Drawing Sheets

METHOD FOR COMMUNICATING EMERGENCY MESSAGES TO AN ELECTRONIC DEVICES ASSOCIATED WITH A TARGET PERSON

CROSS-REFERENCE TO RELATED APPLICATIONS

This patent application is a continuation-in-part of U.S. patent application Ser. No. 16/798,066 filed Feb. 21, 2020, which issued as U.S. Pat. No. 10,827,339 on Nov. 3, 2020, which application claimed priority to U.S. Provisional Application Ser. No. 62/809,126 filed on Feb. 22, 2019.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses, systems and methods that are beneficially utilized to convey information and other messages to persons. In particular, the present invention relates to such apparatuses, systems and methods that are configured to allow emergency personnel to convey messages to persons in order to cause the person to take action that benefits the emergency personnel and the person. Even more particularly, the present invention relates to such apparatuses, systems and methods that transmit emergency messages to an electronic device, including radios, phones, speakers and the like, associated with a person who should take action based on the message.

B. Background

The use of apparatuses, systems and methods to convey information and other messages, which include friendly, personal, promotional, advertising and warning messages, to persons is generally well known to persons skilled in the art and is utilized throughout the world. The message apparatuses, systems and methods are typically configured to transmit a message from one person or entity to one or more target persons, with the target person being a person that will receive the message. With regard to certain types of messages, namely the promotional, advertising and warning messages, the message is typically of the type that the person sending the message desires the target person to take some type action as a result of receiving the message. Other messages, particularly friendly and personal messages, may be of the type suggesting some type of mutual action (like meeting up), but often they are sent primarily for the purpose of merely communicating feelings or thoughts to the target person.

Apparatuses, systems and methods for transmitting messages to one or more target persons can include static devices, such as signs, billboards and the like, that are placed at a location where a target person passing by the apparatus in a motor vehicle will see and, hopefully, read the message being conveyed by the apparatus. Usually, the sign, billboard or other apparatus is fixedly mounted at a location that is at least generally associated with the person or entity sending the message so the person seeing the apparatus may take specific action with his or her motor vehicle, such as exiting a highway and stopping at a gas station, store, restaurant or the like to buy gas, food or etc., that directly benefits or is applicable to the person responsible for the sign, billboard or like message medium and who is sending the message. One common feature for static signs and the like that are intended to deliver a message to target persons in a motor vehicle as the motor vehicle moves along a roadway or the like, is that the messages are fixed in what its says for the duration in which the sign is in position. An exception is some of the variable roadway signs that are utilized by highway departments and like organizations to convey information about the road, weather or missing persons. Except for these emergency highway signs, other roadway signs (particularly billboards and the like) are only configured to convey the same message to persons in motor vehicles until the sign is changed by the sign owner, typically with some effort and cost.

Other types of apparatuses, systems and methods are utilized to convey messages from a vehicle, which may be a car, truck, motorcycle, helicopter or the like, to a person who, generally, is informed or otherwise benefitted by receiving the message. For instance, virtually all emergency vehicles, such as police, fire and ambulance vehicles, have sirens which emit loud sounds and radios that are configured to audibly broadcast a message from the occupant of the vehicle, via a loud speaker associated with the vehicle, to persons who are in relatively close proximity to the vehicle. Such radio broadcasts are often utilized to tell a person who is standing on the street or near a street in the vicinity of the emergency vehicle, to take some action, such as to stop moving (i.e., to make an arrest) or to move out off the street or otherwise out of the way of the emergency vehicle and others. The radio broadcast can also be utilized, often with limited success, to communicate to a person who is in a nearby motor vehicle to instruct the person to take action which is beneficial to the emergency personnel and, usually, to the person himself or herself. Radio broadcasts from airborne vehicles, particularly helicopters, can also be utilized to communicate an emergency message to persons who are in an outdoor area or who are in their motor vehicle to instruct the person to stop taking action (i.e., stop running) or to take action (such as get out of the way and/or take appropriate shelter for their own protection).

As well known, one major issue with regard to emergency personnel being able to broadcast an emergency message from their emergency vehicle to a person who is in their own motor vehicle is that often the person in the vehicle is cannot hear the radio broadcast due to noise in the vehicle and, likely, general inattentiveness. The noise in the vehicle is often the result of music being played at a volume that does not allow the person to hear a radio broadcast originating outside of their vehicle. Noise in a motor vehicle can also be a result of people talking very loud, babies crying and the like. In addition, traffic-related noises around a person's motor vehicle, including the noise associated with other vehicles running, honking and the like, can also make it very hard for a person inside a motor vehicle to hear a radio broadcast originating from outside the vehicle. When the emergency vehicle is a helicopter or the like, the spatial distance between the vehicle and the person, whether in a motor vehicle or not, limits the ability of the emergency vehicle to effectively transmit a radio broadcast to the person. In addition, the noise associated with the operation of a helicopter can also make it very difficult to transmit a radio broadcast from a speaker on the helicopter in a manner which results in other persons hearing the message. If the person is in a motor vehicle, it is even less likely they will hear the message. Inattentiveness of the person, whether outside or in a vehicle, can result from the person talking on a telephone, being deeply engaged in a conservation with another person or a wide variety of other issues, including watching the activity the emergency personnel and/or vehicles are engaged in or proceeding toward. If the personnel in the emergency vehicle could communicate directly to the persons in the vehicles generally near the emergency vehicle, then this would likely overcome the noise and inattentiveness issues and, as such, be of benefit to both the emergency personnel and the other persons.

One common problem, particularly in cities and other areas that have a lot of traffic, is that the emergency vehicle can get stuck in traffic and, therefore, be delayed or unable to respond in time to an emergency. Although an issue for all emergency vehicles, this is particularly a problem for ambulances and fire trucks who are responding to an emergency where someone's life is likely at risk. As will be readily appreciated by persons who are skilled in the art, responding late to a medical emergency or to a structure that is on fire can easily result in very serious injuries or even fatalities that could have been lessened or avoided altogether by an faster response. In some circumstances, the blocked traffic may be so bad that the emergency vehicle will be unable to reach the location of the emergency at all. To address the traffic issue generally requires one or more motor vehicles to move out of the way, such as to the side of the road, to a different lane or into a parking lot, to allow the emergency vehicle to pass. Failure to properly do so can create other problems, such as auto accidents related to such movement. However, if the personnel in the emergency vehicle could communicate directly to persons who are in the vehicles generally near the emergency vehicle, such as the other vehicles stuck in traffic, then this would likely be of benefit to both the emergency personnel and the other persons.

What is needed, therefore, is an improved method for allowing a person in an emergency vehicle to communicate a specially-directed message, referred to herein as an emergency messages, to a person in an outdoor area, in a motor vehicle or elsewhere so that the person can take action, which may be to stop moving or to move to a particular location (such as out of the way or to a safe location), that will benefit the emergency personnel and/or the person (i.e., the target person) who is the target of the message from the emergency personnel. More specifically, a new communication method should be configured to allow emergency personnel associated with or in an emergency vehicle, whether a car, truck, helicopter, drone, robot or the like, to effectively and easily communicate to a target person, whether part of a group or not, that the target person needs to take action, often immediately, which will help or otherwise benefit the emergency personnel and/or the target person. In a preferred configuration, the new method should be adaptable to being utilized with a wide range of different types of emergency vehicles and in a wide variety of different emergency situations. The new method should also be adaptable to for use for a wide variety of military, businesses and civilian purposes.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The new communication system and method of the present invention provides the benefits and solves the problems that are identified above. That is to say, the present invention is directed to a new and improved system and method of communicating emergency messages to nearby persons, whether outside or in a vehicle, that overcomes the problems associated with too much noise around the person and/or a lack of attentiveness by the person. More specifically, the present invention is a system and method for communicating emergency messages to persons who are generally near an emergency vehicle so that the person receiving the message will take action, preferably immediately, that will be of benefit to the emergency personnel and/or to the person himself or herself. The new system and method for communicating emergency messages allows the emergency personnel to communicate, in a one-way manner, directly to an electronic device that is being used by or which is otherwise associated with the person who is the target of the emergency message (i.e., the target person). As set forth in more detail below, the new system and method allows the emergency personnel to access the nearby electronic device and verbally transmit an emergency message to the person using the device or who is near the device so that the person can take beneficial action. The new system and method allows emergency personnel in an emergency vehicle, whether the vehicle is a car, truck, helicopter or the like, or who are associated with an emergency vehicle, such as a drone, robot or the like in order to effectively communicate an emergency message to the target person so that he or she will take action, often immediately, that will help the emergency personnel and/or the person. In the preferred configurations, the new system and method is adaptable to being utilized with a wide range of different types of emergency vehicles, in a wide variety of different emergency situations and for a wide variety of military, businesses and civilian purposes.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention.

The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the new emergency message communicating system and emergency vehicles and situations with which the new system can be utilized, persons who are skilled in the art will readily appreciate that the present invention is not so limited. In addition, the exemplary embodiments of the present device are shown and described with only those components which are required to disclose the present invention. Many of the necessary components for using the present invention are not shown in the drawings or necessarily described below, but which are well known to persons skilled in the relevant art. As will be readily appreciated by such persons, the various elements of the present invention that are described below may take on any form consistent with forms which are readily realized by one of ordinary skill in the art having knowledge of emergency vehicles and situations and with devices and apparatuses that can be utilized to directly communicate with other electronic devices.

Figure 1:
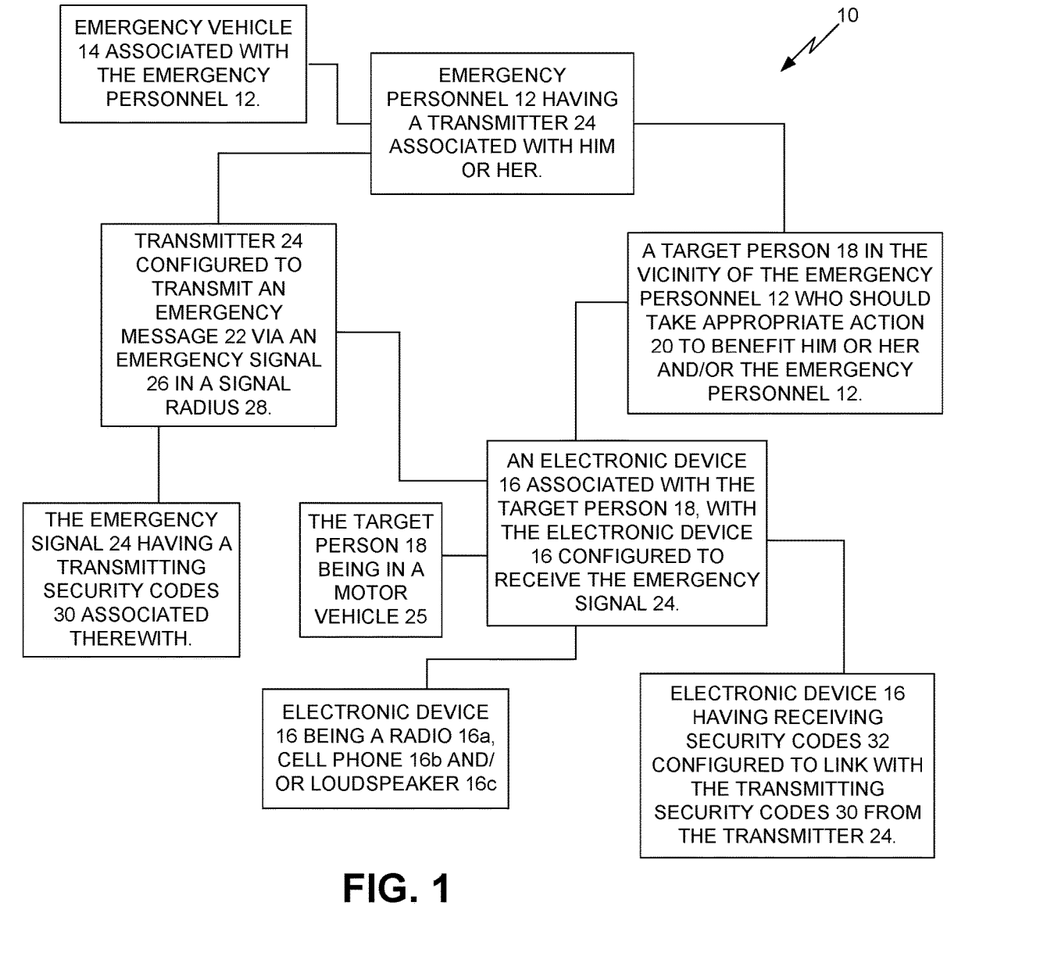
FIG. 1 is a chart showing an emergency message communicating system that is configured according to a preferred embodiment of the present invention.

An emergency message communicating system that is configured pursuant to one or more preferred embodiments of the present invention is shown generally as 10 in FIG. 1. A method of communicating emergency messages that is configured pursuant to one or more preferred embodiments of the present invention is shown generally as 50 in FIG. 2. As shown in this figure and set forth in more detail below, the new emergency message communicating system 10 of the present invention (hereinafter, the "system 10") is beneficially structured and arranged to allow emergency personnel 12 to communicate from a car, motorcycle, truck, helicopter, airplane, ship, drone, robot or other emergency vehicle 14 to an electronic device 16 that is being used by or otherwise associated with a target person 18 who needs to take appropriate action 20 to benefit the emergency personnel 12 and/or the target person 18. As also set forth in more detail below, when using the new system 10 emergency personnel 12 will be able to directly transmit an emergency message 22 from a transmitter 24 that is associated with the emergency personnel 12, such as being located inside the emergency vehicle 14, to the electronic device 16 so that the target person 18 will, hopefully immediately, take the appropriate action 20. As will be readily appreciated by persons who are skilled in the art, the new system 12 will solve many of the issues with regard to a target person 18 who has not heard an emergency siren or other broadcast signal or seen the flashing lights of an emergency vehicle 14 due to noise or other activity around him or her or due to general inattentiveness on the part of the target person 18, often as a result of the target person 18 being engrossed in an inappropriate activity such as talking on the telephone, reading text messages or the like.

For purposes of describing the system 10 of the present invention, emergency personnel 12 includes any type of emergency responder, including law enforcement personnel, firefighters, ambulance drivers, EMTs and the like that need to respond to an emergency and which may, often while in the process of responding to the emergency, need to communicate with persons (i.e., the target person 18) who are in the vicinity of the emergency personnel 12. Likewise, an emergency vehicle 14 in the present system 10 can be any type of vehicle that is or may be utilized by emergency personnel 12 to accomplish their desired tasks, such as responding to an emergency. As set forth in FIG. 1, the electronic device 16 can be a radio 16a in the target person's motor vehicle 25, a cellular telephone 16b being used by the target person 18, a loudspeaker 16c in the vicinity of the target person 18 and the like that is configured to be capable of receiving an emergency message 22 transmitted from the transmitter 24 operated or otherwise controlled by the emergency personnel 12 or someone on his or her behalf. The emergency message 22 can be any type of message or command, whether verbal, audio or visual (such as verbally spoken words, an audible siren and/or visual light) that is or can be communicated to the target person 18 in order to encourage, direct or even demand the target person 18 to take appropriate action 20 that will benefit the emergency personnel 12 and/or the target person 18 (such as for his or her own safety). Although the term target person 16 may typically imply a single individual, the term target person 18 is utilized herein to mean a single individual or a plurality of individuals, such a multiple persons in an outdoor area, multiple persons in one motor vehicle 25 and/or one or more persons in multiple motor vehicles 25. The benefit from the system 10 of the present invention can be allowing the emergency vehicle 16 to move through an area faster by reducing traffic congestion and/or other impedances to rapid movement through the area, allowing the target person 18 to move out of the way for his or her own safety, reducing likelihood of accidents between emergency vehicles 16 and other motor vehicles 25 and the like.

As generally well know to persons in the communication industry, there are a number of networks, such as Wi-Fi, cellular signal and Bluetooth®, that operate within a set system that uses a security feature code or key that enables one electronic device, such as the transmitter 24, to interface with other electronic devices, such as the electronic device 16 associated with the target person 20. In addition, although the ability to provide electronic device access through the use of a network currently exists as a means to establish a connection between electronic devices, the current systems require setup and access processes that are not useful or very applicable to emergency situations. Typically, such applications of the relevant technology are usually contained within a more static group for longer periods of time at home, business or in a vehicle. Use of a network device, such as the transmitter 24, that emits an emergency signal 26 carrying the emergency message 22 for very short periods of time that can interface with all electronic devices 16 within a set radius allows the emergency personnel 12 to quickly and directly access the electronic devices 16 within that set radius for the purpose of alerting the target person 18 to the nearby presence of the emergency personnel 12 and one or more emergency vehicles 14 and allows the emergency personnel 12 to communicate directly to the target person 18 in a manner which is most likely to be able to accomplish the objective of having the target person 18 take the appropriate action 20. Once the transmitter 24 is active, the various signals, software and alert systems that provide one-way communication from the transmitter 24 to the electronic device 16 or multiple electronic devices 16 can be utilized. The present system 10 provides the ability to direct the target person 18 who is in the signal radius 28 of the emergency signal 26 of any impending danger or other reasons for the target person 18 to take the appropriate action 20 in order to avoid delay, harm or other negative consequences.

As will be readily appreciated by persons who are skilled in the art, in order for the electronic connection to take place between the emergency personnel 12 and the target person 18 there must be pre-existing code key systems in place that are contained within the sending device, the transmitter 24, and the applicable receiving device, the electronic device 16, so as to establish a closed electronic communication network between the emergency personnel 12 and target persons 18. Based on the functional range of the emergency signal 26, the transmitter 24 will project a network frequency within a defined signal radius 28, which can be a fixed distance or a user-selectable distance. The frequency selected for the emergency signal 26 will have one or more transmitting security codes 30 (i.e., in the manner of access keys) that will be transmitted to all electronic devices 16 within the signal radius 28. The receiving electronic devices 16 will have one or more pre-existing secure receiving security codes 32 that allow the sending transmitter 24 to start a communication procedure with the electronic device 16 once a connection between the transmitter 24 and electronic device 16 is made. The codes 30/32 for both the transmitter 24 and the electronic device 16 will match in order to provide a secure connection while the transmitter 24 and electronic device 16 are within range of each another (i.e., the signal radius 28). Once the electronic device 16 associated with the target person 18 is no longer in the signal radius 28 of the transmitter 24 associated with the emergency vehicle 14, the emergency signal 26 at the target person 18 will stop, ending the communication process and allowing the transmitter 24 and the electronic device 16 to resume their previous non-connected state. The transmitter 24 is switched on and off at its source, such as inside the emergency vehicle 14, allowing the system 10 to be employed once it is activated and discontinued when it is deactivated. As will be readily appreciated by persons who are skilled in the art, the system 10 of the present invention provides the communication necessary to reduce response times due to traffic delays, keep emergency vehicles 14 and target persons 18 out of each other's way to reduce injuries and save lives, including those of the police, fire and ambulance personnel.

The new system requires a frequency emitting transmitter 24 that contains the same frequency the receiving electronic device 16, which will have been previously programmed to receive the emergency signal 26. As set forth above, the link only takes place when the proper transmitting security codes 30 and receiving security codes 32 meet and the emergency signal 26 is able to register and open communication with the receiving electronic device 16 which will only occur when the electronic device 16 is in the signal radius 28. Persons who are skilled in the relevant art will readily appreciate that the necessary devices and processes for the system 10 can be of a wide variety of electronic devices and/or can be accomplished in a number of ways using a wide variety of different codes and frequencies. The frequency range and signal radius 28 can be defined and adjusted for the purpose or type of communication and information needed to be relayed. Preferably, all electronic devices 16 will be required to have the ability to receive the emergency signal 26 from the transmitter 24 so anyone can be a target person 18, as the need may arise for him or her to take appropriate action 20. In an alternative embodiment, the receiving electronic device 16 can be configured to allow the user to turn the feature on or off, providing security to the user if he or she does not want to participate the system 10 of the present invention.

In one example of using the new system 10, an ambulance (as the emergency vehicle 14) turns on the transmitter 24 when responding to an auto accident. The ambulance 14 accelerates through the streets as the various electronic devices 16 contained within motor vehicles 25 in the signal radius 28 are activated. Once activated, the electronic devices 16 can be configured to lower the volume of the radio 16a in the motor vehicles 25 and transmit a message signal 26, with an emergency message 22, that tells the drivers, as the target persons 16, to be aware that an ambulance 14 is in the area. Once the drivers 16 realize that an ambulance 14 is in their area, each of the drivers 16 will pull their vehicles 25 to the side of the road (as a possible appropriate action 20) until his or her vehicle 25 is no longer in or potentially in the path of the fast moving ambulance 14. As a result, the movement of the ambulance 14 will be unimpeded by the motor vehicles 25, which will significantly reduce response time to allow the victims of the accident to be more quickly rushed to the hospital to reduce injury or prevent loss of life and will reduce the likelihood of an accident between the ambulance 14 and the motor vehicle 25 of the target person 18.

In another example, a helicopter or drone (as the emergency vehicle 14) is looking for an armed criminal in a neighborhood. As is typical, the citizens are unaware that the criminal is in their neighborhood and that a search has begun in their immediate area. The helicopter or drone activates the present system 10 (i.e., the ALERT system) notifying all of the residents (as the target person 18) with the signal radius 28 through their cell phones 16b, as the electronic devices 16, that an armed and dangerous person is in the neighborhood and to stay inside away from windows (as the appropriate action 20). Because everyone in the area, the target persons 18, will have been informed that they need to stay inside their homes while the dangerous person is being apprehended, the target persons 18 are less likely to be harmed by or otherwise become involved in the pursuit and arrest of the dangerous person. After the dangerous person is apprehended, a second emergency message 22 can be sent out from the helicopter or drone to the cell phones 16b of the target persons 18 telling each of these persons that the situation has been resolved.

In yet another example, an active shooter has come on campus with a rifle and a backpack full of ammunition and weapons. The principal or other school personnel will call the police and the campus security will identify where the active shooter is located. With the new system 10, everyone at the school (as the target persons 18) can receive an emergency signal 22 informing them to stay away from the location of the active shooter or, if they are already in that location, to stay put, lock the door and shelter in place (as possible appropriate actions 20). By use of the new system 10, emergency personnel are able to access all of the electronic devices 16 in the entire school, including radios 16a, cell phones 16b and/or loudspeakers 16c, to direct the school personnel and students towards a safer location (as an appropriate action 20), such as where there is a perimeter of police. When the active shooter threat has been addressed by capturing or killing the shooter, the system 10 can be utilized to inform the target persons 18 they are now safe. As such, the new system 10 will provide a means to quickly inform target persons 18 of the threat, suggest appropriate action 20 the target persons 18 to take to improve the likelihood of being safe and to isolate the active shooter and then inform the target persons 18 that the threat has been neutralized. As will be readily appreciated by persons skilled in the art, the emergency personnel 12 can transmit the emergency message 22 from at or near their emergency vehicle 14, which can be a police/sheriff vehicle, a swat-type vehicle, a robot, drone or any other vehicle which can safely approach the area of the active shooter.

The above examples are set forth to merely describe exemplary means of using the new system 10 of the present invention and are not intended to limit the configuration and/or use of the system 10 of the present invention. As will be readily apparent to persons skilled in the art, there are many different types of situations in which the present system 10 will be beneficial. For instance, the emergency message 22 can be transmitted to a loudspeaker 16c or the like, as the electronic device 16 to broadcast the emergency message 22 to a group of people who are at a specific location, such as a bus stop, line into a movie theater, outdoor sports fields and courts and the like. The emergency message 22 can broadcast verbal commands, activate a siren or cause an emergency light to activate, as well as a wide variety of other actions that will let the target persons 18 know that there is an emergency nearby and they should take appropriate action 20. In addition, the system 10 can be configured to allow two-way communication between the transmitter 24 used by the emergency personnel 12 and the electronic device 16 utilized by the target person 18 so the target person 18, whether he or she is in a motor vehicle 25 (e.g., a car, truck, bus, train, ship or the like), field, school, church or other location, can directly communicate information pertaining to any injuries, deaths, warnings and the like to the emergency personnel 12. In other embodiments of the present system 10, the two-way communication can between the emergency personnel 12 and the electronic device 16 associated with a vehicle 25, including driverless motor vehicles, pilotless drones, auto-water craft, robots and the like, or utilized by a target person 18 so the electronic device 16 can confirm the emergency message 22 was received, the appropriate action 20 was taken and/or other useful information.

In one of the preferred embodiments of the present invention, the emergency message communicating system 10 comprises the following: (1) an emergency personnel 12 who needs to transmit an emergency message 22; (2) an emergency vehicle 14 that is associated with the emergency personnel 12; (3) a target person 18 who will benefit by receiving the emergency message 22 from the emergency personnel 12 in order for the target person 18 to take an appropriate action to benefit the emergency personnel 12 and/or the target person 18; (4) a transmitter 24 which is associated with the emergency personnel 12 and the emergency vehicle 14; and (5) an electronic device that is associated with the target person 18. In the preferred embodiments, the transmitter 24 is configured to directly transmit an emergency signal 26 only to the target person 18 who is in a signal radius 28 associated with the transmitter 24, the emergency signal 26 electronically carries the emergency message 22, the transmitter 24 is configured to transmit one or more transmitting security codes 30, the transmitter 24 is configured such that the on and off operation of the transmitter 24, the duration and content of the emergency message 22 and the range of the signal radius 28 is selected and controlled by the emergency personnel 12. Additionally, in the preferred embodiments the electronic device 16 is electronically connected to the transmitter 24 and cooperatively configured to receive the emergency message 22 only from the transmitter 24 in order to communicate the emergency message 22 to the target person 18 so the target person 18 will take the appropriate action 20, the electronic device 16 is configured with one or more receiving security codes 32, with the transmitting security codes 30 and the receiving security codes 32 being selected to electronically connect the transmitter 24 to the electronic device 16 so to allow the emergency message 22 to only be received by the electronic device 16 associated with the target person 18 and to beneficially control the audio and/or visual function of the electronic device 16 to improve the ability of the target person 18 to receive the emergency message 22 from the emergency personnel 12. In certain embodiments, the transmitter 24 is attached to the emergency vehicle 14 and/or the target person 18 is in a motor vehicle 25. In other embodiments, the receiving security code 32 is pre-selected so as to be secure for the electronic device 16. In certain embodiments, the electronic device 16 is a radio 16a, a cell phone 16b (e.g., a mobile or smart phone) and/or a loudspeaker 16c.

In another of the preferred embodiments of the present invention, the new emergency message communicating system 10 comprises: (1) an emergency personnel 12 who needs to transmit an emergency message 22; (2) an emergency vehicle 14 associated with the emergency personnel 12; (3) a target person 18 who will benefit by receiving the emergency message 22 from the emergency personnel 12 in order for the target person 18 to take an appropriate action 20 to benefit at least one of the emergency personnel 12 and target person 18; (4) a transmitter 24 associated with the emergency personnel 12 and attached to the emergency vehicle 14; (5) a motor vehicle 25 associated with the target person 18; and (6) an electronic device 16 associated with the target person 18 and the motor vehicle 25. In the preferred embodiments, the transmitter 24 is configured to directly transmit an emergency signal 26 only to the target person 18 who is in a signal radius 28 that is associated with the transmitter 24, the emergency signal 26 electronically carries the emergency message 22, the transmitter 24 is configured to transmit one or more transmitting security codes 30, the transmitter 24 is configured such that the on and off operation of the transmitter 24, the duration and content of the emergency message 22 and the range of the signal radius 28 is selected and controlled by the emergency personnel 12. Additionally, preferably the electronic device 16 is electronically connected to the transmitter 24 and cooperatively configured to receive the emergency message 22 only from the transmitter 24 so as to communicate the emergency message 22 to the target person 18 so the target person 18 will take the appropriate action 20, the electronic device 16 is configured with one or more pre-selected secure receiving security codes 32, the transmitting security codes 30 and the receiving security codes 32 are selected so as to electronically connect the transmitter 24 to the electronic device 16 in order to allow the emergency message 22 to only be received by the electronic device 16 which is associated with the target person 18 and to beneficially control the audio and/or visual function of the electronic device 16 to improve the ability of the target person 18 to receive the emergency message 22 from the emergency personnel 12. In certain embodiments, the electronic device 16 is disposed in or attached to the motor vehicle 25 that is associated with the target person 18 and the electronic device 16 is a radio 16a, a cell phone 16b and/or a loudspeaker 16c.

Figure 2:
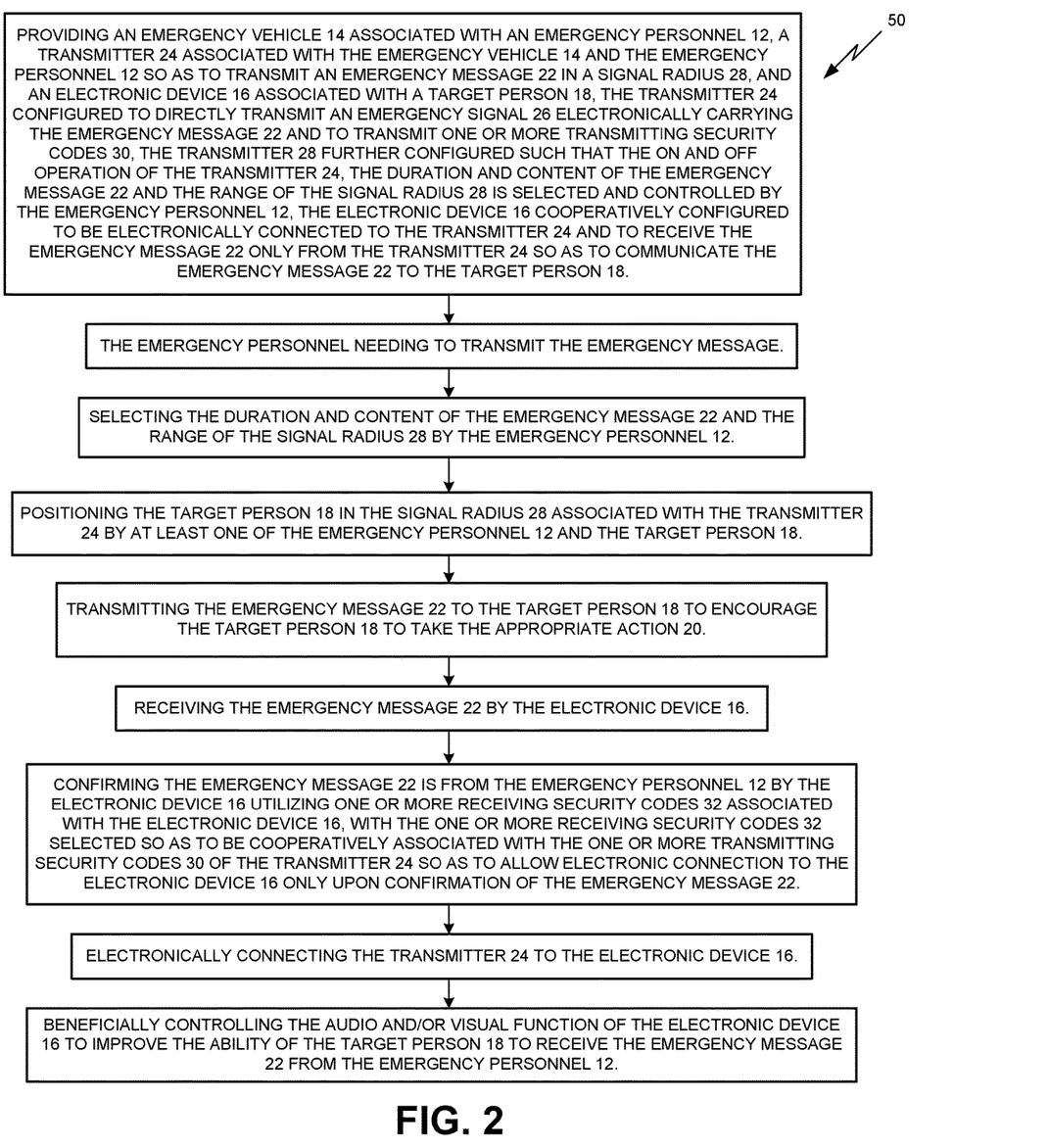
FIG. 2 is a flow chart summarizing a method of communicating emergency messages that is configured according to a preferred embodiment of the present invention.

The new method for communicating emergency messages 50 of the present invention (hereinafter referred to as the "method 50") is summarized in FIG. 2. The new method 50 incorporates the discussion and components set forth above with regard to the system 10. In one of the preferred embodiments, the new method 50 for communicating an emergency message 22 from an emergency personnel 12 to a target person 18 in order for the target person 18 to take an appropriate action 20 that will benefit at least one of the emergency personnel 12 and the target person 18 of the present invention generally comprises the steps of: (a) providing an emergency vehicle 14 associated with the emergency personnel 12, a transmitter 24 associated with the emergency vehicle 14 and the emergency personnel 12 so as to transmit the emergency message 22 in a signal radius 28, and an electronic device 16 associated with the target person 18, the transmitter 24 configured to directly transmit an emergency signal 26 electronically carrying the emergency message 22 and to transmit one or more transmitting security codes 30, the transmitter 28 further configured such that the on and off operation of the transmitter 24, the duration and content of the emergency message 22 and the range of the signal radius 28 is selected and controlled by the emergency personnel 12, the electronic device 16 cooperatively configured to be electronically connected to the transmitter 24 and to receive the emergency message 22 only from the transmitter 24 so as to communicate the emergency message 22 to the target person 18; (b) the emergency personnel needing to transmit the emergency message; (c) selecting the duration and content of the emergency message 22 and the range of the signal radius 28 by the emergency personnel 12; (d) positioning the target person 18 in the signal radius 28 associated with the transmitter 24 by at least one of the emergency personnel 12 and the target person 18; (e) transmitting the emergency message 22 to the target person 18 to encourage the target person 18 to take the appropriate action 20; (f) receiving the emergency message 22 by the electronic device 16; (g) confirming the emergency message 22 is from the emergency personnel 12 by the electronic device 16 utilizing one or more receiving security codes 32 associated with the electronic device 16, with the one or more receiving security codes 32 selected so as to be cooperatively associated with the one or more transmitting security codes 30 of the transmitter 24 so as to allow electronic connection to the electronic device 16 only upon confirmation of the emergency message 22; (h) electronically connecting the transmitter 24 to the electronic device 16; and (i) beneficially controlling the audio and/or visual function of the electronic device 16 to improve the ability of the target person 18 to receive the emergency message 22 from the emergency personnel 12. In certain embodiments, the transmitter 24 is attached to the emergency vehicle 14, the target person 18 is in a motor vehicle 25, and/or the electronic device 16 is disposed in or attached to the motor vehicle 25. The emergency vehicle 14 can be a manned or unmanned vehicle, such as drones, autonomously operated vehicles and robots. As with the system 10, the electronic device 16 can be a radio 16a, a cell phone 16b and/or a loudspeaker 16c. In some of the preferred embodiments, the receiving security code 32 is pre-selected so as to be secure for the electronic device 16.

As will be readily appreciated by persons who are skilled in the art, the emergency vehicle 14 can be a manned vehicle such as a car, motorcycle, truck, helicopter, airplane, ship or the like or it can be an unmanned vehicle such as an autonomously operated vehicle, remotely controlled vehicle, drone, robot or the like that is or may be utilized by emergency personnel 12 to accomplish their desired tasks, such as responding to an emergency. As will also be appreciated by persons who are skilled in the art, the system 10 and method 12 of the present invention will be useful for a wide variety of military, businesses and civilian purposes. As such, the emergency personnel 12 includes any type of emergency responder, including law enforcement personnel, firefighters, ambulance drivers, EMTs, members of the military or private/public security forces and the like that need to respond to an emergency and which may, while in the process of responding to the emergency, need to communicate with target person 18 who is in the vicinity of the emergency personnel 12 and/or the emergency.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A method of emergency communication, comprising the steps of:
   a) providing an emergency vehicle associated with an emergency personnel, a transmitter associated with said emergency vehicle and said emergency personnel so as to transmit an emergency message to a target person in a signal radius, and an electronic device associated with said target person, said transmitter configured to transmit an emergency signal electronically carrying said emergency message and to transmit one or more transmitting security codes associated with said emergency signal, said transmitter further configured such that an on and off operation of said transmitter, a duration and content of said emergency message and said signal radius are selected and controlled by said emergency personnel, said electronic device cooperatively configured to be electronically connected to said transmitter and to receive said emergency message from said transmitter so as to be able to communicate said emergency message to said target person;

b) said emergency personnel needing to transmit said emergency message;

c) selecting said duration and content of said emergency message and said signal radius by said emergency personnel;

d) positioning said target person in said signal radius associated with said transmitter by movement of at least one of said emergency personnel, said emergency vehicle and said target person and/or by adjustment of said signal radius by said emergency personnel;

e) transmitting said emergency message to said electronic device to encourage said target person to take an appropriate action that will benefit at least one of the emergency personnel and the target person;

f) receiving said emergency message by said electronic device;

g) confirming said emergency message is from said emergency personnel by said electronic device utilizing one or more receiving security codes associated with said electronic device after said receiving step, said one or more receiving security codes selected so as to be cooperatively associated with said one or more transmitting security codes of said transmitter so as to allow electronic connection to said electronic device only upon confirmation that said emergency message is from said emergency personnel;

h) electronically connecting said transmitter to said electronic device; and i) beneficially controlling said audio and/or visual function of said electronic device to improve said ability of said target person to receive said emergency message from said emergency personnel.

2. Said method of claim 1, wherein said transmitter is attached to said emergency vehicle.

3. Said method of claim 1, wherein said target person is in a motor vehicle.

4. Said method of claim 3, wherein said electronic device is disposed in or attached to said motor vehicle.

5. Said method of claim 4, wherein said electronic device is at least one of a radio, a cell phone and a loudspeaker.

6. Said method of claim 1, wherein said electronic device is at least one of a radio, a cell phone and a loudspeaker.

7. A method of emergency communication, comprising the steps of:
a) providing an emergency vehicle associated with an emergency personnel, a transmitter attached to said emergency vehicle and associated with said emergency personnel so as to transmit an emergency message to a target person in a signal radius, and an electronic device associated with said target person, said transmitter configured to transmit an emergency signal electronically carrying said emergency message and to transmit one or more transmitting security codes associated with said emergency signal, said transmitter further configured such that an on and off operation of said transmitter, a duration and content of said emergency message and said signal radius are selected and controlled by said emergency personnel, said electronic device cooperatively configured to be electronically connected to said transmitter and to receive said emergency message from said transmitter so as to communicate said emergency message to said target person, said electronic device being at least one of a radio, a cell phone and a loudspeaker;

b) said emergency personnel needing to transmit said emergency message;

c) selecting said duration and content of said emergency message and said signal radius by said emergency personnel;

d) positioning said target person in said signal radius associated with said transmitter by movement of at least one of said emergency personnel and said target person and/or by adjustment of said signal radius by said emergency personnel;

e) transmitting said emergency message to said electronic device to encourage said target person to take an appropriate action that will benefit at least one of the emergency personnel and the target person;

f) receiving said emergency message by said electronic device;

g) confirming said emergency message is from said emergency personnel by said electronic device utilizing one or more receiving security codes associated with said electronic device, said one or more receiving security codes selected so as to be cooperatively associated with said one or more transmitting security codes of said transmitter so as to allow electronic connection to said electronic device only upon confirmation of said emergency message;

h) electronically connecting said transmitter to said electronic device; and i) beneficially controlling said audio and/or visual function of said electronic device to improve said ability of said target person to receive said emergency message from said emergency personnel.

8. Said method of claim 7, wherein said receiving security code is pre-selected so as to be secure for said electronic device.

9. Said method of claim 7, wherein said target person is in a motor vehicle.

10. Said method of claim 9, wherein said electronic device is disposed in or attached to said motor vehicle.

11. A method of emergency communication, comprising the steps of:
a) providing an emergency vehicle associated with an emergency personnel, a transmitter attached to, integral with or disposed in said emergency vehicle so as to be associated with said emergency personnel to allow said emergency personnel to transmit an emergency message to a target person in a signal radius and an electronic device associated with said target person, said emergency vehicle being at least one of an autonomously operated vehicle, a remotely controlled vehicle, a drone and a robot, said transmitter being configured to transmit an emergency signal electronically carrying said emergency message and to transmit one or more transmitting security codes associated with said emergency signal, said transmitter further configured such that an on and off operation of said transmitter, a duration and content of said emergency message and said signal radius are selected and controlled by said emergency personnel, said electronic device cooperatively configured to be electronically connected to said transmitter and to receive said emergency message from said transmitter so as to communicate said emergency message to said target person, said electronic device being at least one of a radio, a cell phone and a loudspeaker;
b) said emergency personnel needing to transmit said emergency message;
c) selecting said duration and content of said emergency message and said signal radius by said emergency personnel;
d) positioning said target person in said signal radius associated with said transmitter by movement of at least one of said emergency personnel and said target person and/or by adjustment of said signal radius by said emergency personnel;
e) transmitting said emergency message to said electronic device to encourage said target person to take an appropriate action that will benefit at least one of the emergency personnel and the target person;
f) receiving said emergency message by said electronic device;
g) confirming said emergency message is from said emergency personnel by said electronic device utilizing one or more receiving security codes associated with said electronic device, said one or more receiving security codes selected so as to be cooperatively associated with said one or more transmitting security codes of said transmitter so as to allow electronic connection to said electronic device only upon confirmation of said emergency message, said receiving security code beings pre-selected so as to be secure for said electronic device;
h) electronically connecting said transmitter to said electronic device; and
i) beneficially controlling said audio and/or visual function of said electronic device to improve said ability of said target person to receive said emergency message from said emergency personnel.

12. Said method of claim 11, wherein said target person is in a motor vehicle.

13. Said method of claim 12, wherein said electronic device is attached to said motor vehicle.

* * * * *